US011716989B2

(12) United States Patent
Fernandez

(10) Patent No.: US 11,716,989 B2
(45) Date of Patent: Aug. 8, 2023

(54) CADAVER PRESERVATION SYSTEMS AND METHODS

(71) Applicant: Maximum Fidelity Surgical Simulations, LLC, Columbia, MO (US)

(72) Inventor: Joss Dean Fernandez, Columbia, MO (US)

(73) Assignee: MAXIMUM FIDELITY SURGICAL SIMULATIONS, LLC, Columbia, MO (US)

( * ) Notice: Subject to any disclaimer, the term of this patent is extended or adjusted under 35 U.S.C. 154(b) by 454 days.

(21) Appl. No.: 16/945,279

(22) Filed: Jul. 31, 2020

(65) Prior Publication Data

US 2021/0037809 A1 Feb. 11, 2021

Related U.S. Application Data

(60) Provisional application No. 62/834,668, filed on Apr. 16, 2019.

(51) Int. Cl.
*A01N 1/00* (2006.01)

(52) U.S. Cl.
CPC ...................... *A01N 1/00* (2013.01)

(58) Field of Classification Search
CPC ....... A01N 1/00; G01N 1/30; G01N 2001/305
See application file for complete search history.

(56) References Cited

U.S. PATENT DOCUMENTS

| | | |
|---|---|---|
| 3,233,607 A | 2/1966 | Bolie |
| 3,279,464 A | 10/1966 | Kline |
| 3,371,662 A | 3/1968 | Heid et al. |
| 3,455,298 A | 7/1969 | Anstadt |
| 3,587,567 A | 6/1971 | Schiff |
| 3,912,809 A | 10/1975 | Rendon |
| 4,048,990 A | 9/1977 | Goetz |
| 4,192,293 A | 3/1980 | Asrican |
| 4,506,658 A | 3/1985 | Casile |
| 4,536,893 A | 8/1985 | Parravicini |
| 4,621,617 A | 11/1986 | Sharma |
| 4,690,134 A | 9/1987 | Snyders |
| 4,731,076 A | 3/1988 | Noon et al. |
| 4,957,477 A | 9/1990 | Lundback |
| 4,982,481 A | 1/1991 | Deutscher |
| 5,169,381 A | 12/1992 | Snyders |
| 5,178,620 A | 1/1993 | Eggers et al. |
| 5,256,132 A | 10/1993 | Snyder |
| 5,429,797 A | 7/1995 | Camiener |
| 5,558,617 A | 9/1996 | Heilman et al. |
| 5,574,019 A | 11/1996 | Segall et al. |
| 5,607,411 A | 3/1997 | Heironimus et al. |
| 6,110,139 A | 8/2000 | Loubser |
| 6,190,400 B1 | 2/2001 | Van De Moer et al. |
| 6,191,193 B1 | 2/2001 | Lee et al. |
| 6,218,099 B1 | 4/2001 | Segall et al. |
| 6,312,694 B1 | 11/2001 | Thorpe et al. |
| 6,371,942 B1 | 4/2002 | Schwartz et al. |
| 6,478,808 B2 | 11/2002 | Nowakowski |
| 6,790,043 B2 | 9/2004 | Aboud |
| 6,824,389 B1 | 11/2004 | Garre, Jr. et al. |
| 6,980,774 B2 | 12/2005 | Shi et al. |
| 9,968,292 B2 | 5/2018 | Gardner et al. |
| 2002/0018752 A1 | 2/2002 | Krall et al. |
| 2003/0180824 A1 | 9/2003 | Mpock et al. |
| 2003/0186203 A1 | 10/2003 | Aboud |
| 2003/0206884 A1 | 11/2003 | Barrow |
| 2007/0254273 A1 | 11/2007 | Lafrance et al. |
| 2009/0012413 A1 | 1/2009 | Sabbah et al. |
| 2009/0130104 A1 | 5/2009 | Muzykantov et al. |
| 2009/0246747 A1 | 10/2009 | Buckman, Jr. |
| 2010/0323339 A1 | 12/2010 | Ritchie |
| 2012/0270197 A1 | 10/2012 | Brost et al. |
| 2013/0137702 A1 | 5/2013 | Steiner |
| 2014/0270738 A1 | 9/2014 | Lynch |
| 2014/0272880 A1 | 9/2014 | Buckman |
| 2016/0140878 A1 | 5/2016 | Fernandez |
| 2016/0287744 A1 | 10/2016 | Kobayashi et al. |
| 2018/0108276 A1 | 4/2018 | Ishimaya et al. |
| 2018/0315346 A1 | 11/2018 | Richier et al. |

FOREIGN PATENT DOCUMENTS

| | | | |
|---|---|---|---|
| CN | 207517243 U | 6/2018 | |
| EP | 1965190 A1 * | 9/2008 | ............... G01N 1/30 |
| PE | 002517-2019DIN | 7/2020 | |
| WO | 2006124021 A1 | 11/2006 | |

(Continued)

OTHER PUBLICATIONS

Hrobonova et al., Determination of methionine enantiomers by HPLC on the cyclofructan chiral stationary phase, 2015, Analytical Methods, 7, 4577-4582 (Year: 2015).*
Sagratini et al., Simultaneous determination of eight underivatised biogenic amines in fish by solid phase extraction and liquid chromatography-tandem mass spectrometry, Nov. 4, 2011, 132, 536-543 (Year: 2011).*
Deepak, Importance of HPLC grade solvents in HPLC analysis, Feb. 7, 2018 (Year: 2018).*
International Search Report and Written Opinion received for PCT/US18/60808 dated Mar. 6, 2019, 12 pages.
International Search Report and Written Opinion received for PCT/US2015/061399 dated Feb. 2, 2016, 10 pages.
Abboud, M.D., et al., "New laboratory model for neurosurgical training that stimulates live surgery," J. Neurosurg, Dec. 2002, pp. 1367-1372, vol. 97, USA.
Chevallier et al., "Postmortem Circulation: A New Model for Testing Endovascular Devices and Training Clinicians in Their Use," Clinical Anatomy, 2014, pp. 556-562, vol. 27.

(Continued)

*Primary Examiner* — David J Blanchard
*Assistant Examiner* — Edwin Coleman Mitchell
(74) *Attorney, Agent, or Firm* — Kutak Rock LLP; Brian L. Main

(57) ABSTRACT

A system and method of preserving cadaveric tissue is provided. The present invention utilizes a preservation fluid having high-dose DMSO, high-dose acetic acid, and isopropyl alcohol. It is believed that the high-dose DMSO serves as a hardening agent while the high-dose acetic acid serves as a softening agent.

15 Claims, No Drawings

(56) References Cited

FOREIGN PATENT DOCUMENTS

| WO | 2007089777 A2 | 8/2007 |
|---|---|---|
| WO | 2011126801 A2 | 10/2011 |
| WO | 2014052158 A3 | 4/2014 |
| WO | 2018126254 A1 | 7/2018 |
| WO | 2019094959 A1 | 5/2019 |

OTHER PUBLICATIONS

Garrett, Edward H., Jr. MD, "A human-cadaveric circulation model," Journal of Vascular Surgery, 2001, pp. 1128-1130, vol. 33, No. 5.
Carey et al., "Simulation of plastic surgery and microvascular procedures using perfused fresh human cadavers," Journal of Plastic, Reconstructive & Aesthetic Surgery, 2014, pp. e42-e48, vol. 67.
Gomez et al., "Study of postmortem blood circulation," 1 page abstract, 1989, Spain.
Russin et al., "Simulation of a High-Flow Extracranial-Intracranial Bypass Using a Radial Artery Graft in a Novel Fresh Tissue Model," Neurosurgery, Dec. 2012, pp. ons315-ons320, vol. 71, No. 2.
Arbatli et al., "Dynamic Human Cadaver Model for Testing the Feasibility of New Endovascular Techniques and Tools," Anals of Vascular Surgery, Apr. 2010, pp. 419-422, vol. 24, issue 3.
Wolff et al., "Flap raising on pulsatile perfused cadaveric tissue: A novel method for surgical teaching and exercise," Journal of Cranio-Maxillo-Facial Surgery, 2014, pp. 1423-1427, vol. 42, Elsevier Ltd.
Willaert et al., "Postmortem Pump-Driven Reperfusion of the Vascular System of Porcine Lungs: Towards a New Model for Surgical Training," European Surgical Research, Jan. 2014, pp. 8-20, vol. 52.
Perlmutter et al., "Microsurgical anatomy of the distal anterior cerebral artery," J. Nuerosurg., Aug. 1978, pp. 204-228, vol. 49.
De Castro Abreu, M.D., et al., "Robotic Transabdominal Control of the Suprahepatic, Infradiaphragmatic Vena Cava to Enable Level 3 Caval Tumor Thrombectomy: Pilot Study in a Perfused-Cadaver Model," Journal of Endourology, Oct. 2015, pp. 1177-1181, vol. 29, No. 10.
Gray, Richard, "What lurks beneath: plastinated veins of blue shark to feature in new exhibition," Apr. 2012, https://www.telegraph.co.uk/news/newstopics/howaboutthat/9178001/What-lurks-beneath-plastinated-veins-of-blue-shark-to-feature-in-new-exhibition.html (last accessed Aug. 5, 2019).
Carey et al., "Perfused fresh cadavers: method for application to surgical simulation," The American Journal of Surgery, Jul. 2015, vol. 210, No. 1, pp. 179-187, Elsevier.
"MedCure Now Offers Perfused Fresh Tissue Models," press release, 3 pages, Oct. 2014.
Extended European Search Report, dated May 4, 2018 in EP Application No. 15861329.9, 7 pages.
Aboud et al., "Novel Simulation for Training Trauma Surgeons," The Journal of Trauma Injury, Infection, and Critical Care, Dec. 2011, pp. 1484-1486, vol. 71, No. 6.
DeLorenzo et al., "Perfused Cadavers as a Training Model for Invasive Lifesaving Procedures," Annals of Emergency Medicine, Nov. 2013, 1 page abstract, vol. 62, No. 5.
International Search Report and Written Opinion Received for PCT Application No. PCT/US2020/033252, dated Sep. 9, 2020, 12 pages.
International Preliminary Report on Patentability received for International Application No. PCT/US2018/060808, dated May 19, 2020, dated May 28, 2020.

* cited by examiner

CADAVER PRESERVATION SYSTEMS AND METHODS

PRIORITY CLAIM

The instant application further claims priority to U.S. provisional patent application No. 62/834,668, which was filed on 16 Apr. 2019, which is incorporated by reference.

FIELD OF THE INVENTION

The present invention relates generally to systems for and methods of preserving cadaver tissue. More specifically, the present invention is concerned with systems for and methods of preserving cadaver tissue for use with surgical training, including surgical training that utilizes energy devices and/or reconstituted circulation.

BACKGROUND OF THE INVENTION

The successful training and preparation of physicians depends on accurate and realistic simulations, with cadavers and human organs remaining an important resource for such training. Unfortunately, dead tissue tends to decay and performing procedures on plastic models and animals is significantly different from performing the same procedure on a living patient. Consequently, it would be beneficial to have a system for and a method of more closely modeling a living patient (or at least living tissue) during physician training and medical research.

Current embalming and preservation practices for human or animal cadavers are not designed for the specific needs of modern surgical training. Current day surgical training requires a cadaver which has realistic tissue handling characteristics that responds to sewing, stapling, and other manipulation, including robotic manipulation by modern surgical devices. Modern surgery also makes use of electrocautery, radiofrequency, ultrasonic devices for hemostasis, and the like. In addition, dynamic cadaver surgical training requires reconstitution of the cadaver circulation. Unfortunately, there is no existing embalming or preservation method that exists that allows all of these functions while preserving realism and allowing for the safe use of electrocautery or other energy devices, such as those used in every day surgery. Accordingly, surgical training often requires the use of un-embalmed fresh cadavers that are preserved using refrigeration only, which dramatically increases costs and limits durability and usability. Consequently, it would be beneficial to have a system for and a method of preserving cadaveric tissue that does not require refrigeration. It would further be beneficial if the system and method preserves realism while allowing for the safe use of energy devices and/or other modern day surgical equipment/instruments. It would still further be beneficial if the system and method allowed for cadaver perfusion, such as reconstitution of cadaver circulation.

Existing preservation fluids use chemical components that have a large number of draw backs. For instance, chemicals such as formaldehyde may harm personnel and/or the environment. Dangers include, but are not necessarily limited to, mucosal irritation, headaches, nausea, reduced long term pulmonary function, and cancer. Consequently, it would be beneficial to have a system for and a method of preserving cadaveric tissue that does not require use of formaldehyde or other similar chemicals.

U.S. Pat. No. 9,861,094 to Dissard et al., the entire disclosure of which is incorporated herein by reference, teaches an embalming method that utilizes substances such as Bronopol. While presumably adequate for its intended purposes, substances such as Bronopol are highly flammable and could not be used safely with electrocautery. Consequently, it would be beneficial to have a system for and a method of preserving cadaveric tissue that does not require use of such chemicals.

U.S. Pat. No. 9,426,980 to Tousimis, the entire disclosure of which is incorporated herein by reference, teaches a process of dehydration using alcohol infused bodies. While presumably adequate for its intended purposes, such a process results in the loss of tissue elasticity while creating a flammability danger. Consequently, it would be beneficial to have a system for and a method of preserving cadaveric tissue that does not require such dehydration using alcohol infused bodies.

U.S. Pat. No. 8,015,677 to Barrow, the entire disclosure of which is incorporated herein by reference, teaches polyvinylpyrrolidone-iodine combined with a water soluble vegetable polymer along with other products. While presumably adequate for its intended purposes, such processes makes cadaver perfusion difficult or impossible. Furthermore, such processes have not been shown to preserve a cadaver long term. Consequently, it would be beneficial to have a system for and a method of preserving cadaveric tissue that does not require such a combination. It would further be beneficial if the system and method enabled long-term preservation of cadavers while facilitating cadaver perfusion.

Still other processes use saline solutions, such as a high super saturated saline solution. Unfortunately, such processes increase conductivity to the point that energy devices are short circuited. Consequently, it would be beneficial to have a system for and a method of preserving cadaveric tissue that does not cause energy devices to short circuit. Some systems and methods of the prior art utilize saline solutions (and/or other solutions) to draw intracellular fluid, such as water or the like, out of cells and/or to otherwise cause intracellular fluid to be drained, replaced, diluted, or the like. Unfortunately, such processes can change one or more characteristic of the cadaveric tissue, such as by partially or fully dehydrating the tissue, changing tissue impedance, or the like. Furthermore, such processes can change one or more characteristic of the preservation fluid, such as changing the pH of the preservation fluid or the like ("diluting" the preservation fluid). Consequently, it would be beneficial to have a system and method that preserves cadaveric tissue characteristics. It would be further beneficial if such system and method eliminated or otherwise reduced dilution of the preservation fluid.

Still other processes, such as those disclosed in U.S. Pat. No. 5,622,696 to Camiener, the entire disclosure of which is incorporated by reference, teaches dialdehydes that are allegedly useful as embalming agents. It would be beneficial to have a system for and a method of preserving cadaveric tissue that does not require use of an aldehyde.

SUMMARY OF THE INVENTION

The present invention comprises a novel system for and a method of preserving cadaveric tissue. In some embodiments, the system and method achieves one or more goal of modern day embalming methods. For instance, in some embodiments, systems and methods of the present invention: facilitate preservation of the cadaveric tissue for at least two weeks or at least three months without requiring refrigeration; maintain tissue handling characteristics and/or appearances of a fresh body; allow for the use of various surgical energy sources, such as electrocautery, radiofrequency, ultrasonic energy, and the like; and/or allow for reconstitution of arterial and/or venous circulation. In some embodiments, systems and methods of the present invention avoid use of toxic chemicals, such as chemicals that are known to harm personnel and/or the environment. In some embodiments, systems and methods of the present invention utilize a unique preservation fluid.

In some embodiments, the preservation fluid of the present invention includes an aprotic solvent, a weak acid, and an oxygenated hydrocarbon (e.g., a ketone, an alcohol, an ether, or the like). In some embodiments, the preservation fluid consists of the aprotic solvent, the weak acid, and the oxygenated hydrocarbon. In some embodiments, the preservation fluid is anhydrous, excluding any water associated with the weak acid and/or the oxidized hydrocarbon. In some embodiments, the weak acid and/or the oxidized hydrocarbon is anhydrous. For example, in some embodiments, the weak acid is anhydrous (glacial) acetic acid. For example, in some embodiments, the oxygenated hydrocarbon is anhydrous (>95%) acetone. In some embodiments, the pH of the preservation fluid is acidic, below 5, or below 4.

In some embodiments, the aprotic solvent is dimethyl sulfoxide (DMSO). In some embodiments, the preservation fluid includes a high dose of DMSO (or other aprotic solvent). In some embodiments, the aprotic solvent makes up between about 15% and about 30%, by volume, of the preservation fluid. In some embodiments, the aprotic solvent makes up less than 30%, by volume, such as, e.g., about 15%, by volume, of the preservation fluid.

In some embodiments, the weak acid is acetic acid. In some embodiments, the acetic acid is glacial acetic acid. In some embodiments, the acetic acid is vinegar. In some embodiments, the normality of the weak acid is between that of vinegar and glacial acetic acid. In some embodiments, the weak acid makes up a majority of the preservation fluid. In some embodiments, the weak acid makes up between about 60% and about 75%, by volume, of the preservation fluid.

In some embodiments, the oxygenated hydrocarbon is isopropyl alcohol (IPA). In some embodiments, the alcohol is anhydrous. In some embodiments, the alcohol is between 100 and 180 proof (i.e., 50% and 90%, respectively). In some embodiments, the alcohol is 140 proof (i.e., 70%). In some embodiments, the alcohol makes up a small portion of the preservation fluid. In some embodiments, the alcohol makes up between about 10% and about 25%, by volume, of the preservation fluid.

In some embodiments, the oxygenated hydrocarbon is acetone. In some embodiments, the acetone is anhydrous. In some embodiments, the acetone is between 50%-99.5% with the balance being water. In some embodiments, the acetone makes up a small portion of the preservation fluid. In some embodiments, the acetone makes up between about 10% and about 25%, by volume, of the preservation fluid.

U.S. Pat. No. 5,679,333 to Dunphy, the entire disclosure of which is incorporated herein by reference, teaches an aqueous solution (between 19.4% and 85.8% water) for preserving cadaveric tissue. To the extent that Dunphy teaches an aprotic solvent (DMSO) within the aqueous solution, Dunphy teaches no more than 0.03% of such solvent. U.S. Pat. Nos. 5,405,606 and 5,622,695, each to Campbell et al., the entire disclosures of which are incorporated herein by reference, each teach a slightly higher concentration of DMSO, but not more than 1% DMSO. Campbell et al. also teaches an aqueous solution (>50% water).

Dunphy suggests that a minute amount (presumably the 0.03% taught) of polar aprotic solvent, such as DMSO, within its aqueous solution can increase cellular membrane permeability, thereby facilitating the denaturing of intracellular proteins. Dunphy also suggests that Ethanedial (an aldehyde) within its aqueous solution crosslinks cellular membrane proteins by bonding aldehydic functional groups to amino acids' functional groups. In other words, Dunphy teaches dilution (intracellular fluid mixing with preservation fluid) and an aldehydic-dependent leathering process. Campbell et al. similarly includes an aldehyde (glutaraldehyde). In some embodiments, the preservation fluid of the present invention is free of aldehyde.

Without wishing to be bound to any particular theory, it is believed that low dose DMSO allows for the crosslinking of protein and increased permeability across cellular membranes. Crosslinking of proteins (leathering) reduces the ability of bacteria to putrefy the tissue. Increasing permeability across cellular membranes, on the other hand, allows for the penetration of the weak acid into the cells of the tissue, thereby reducing the pH of the tissue. In some embodiments, methods of the present invention reduce the pH of the tissue to at or below a threshold pH value, thereby making the environment uninhabitable for bacteria. In some embodiments, the threshold pH value for the tissue is obtained by utilizing a preservation fluid having an optimal pH value. In some embodiments, the optimal pH value of the preservation fluid is less than 4.

In some embodiments, the preservation fluid includes high dose (>15%) DMSO, thereby creating an environment that is even more hostile for microbes than an environment created using acetic acid alone. Without wishing to be bound to any particular theory, it is believed that even higher doses of DMSO, such as 10%, 15%, 20%, 25%, or even as much as 30% DMSO, creates an extremely poor substrate environment for microbes.

High dose DMSO (>15%) is novel and not obvious from prior disclosures at least because DMSO has not been used to preserve entire anatomic specimens. Furthermore, to the extent that prior disclosures teach DMSO for use in preservation fluids, such fluids include very low concentrations of DMSO. For instance, Dunphy and Campbell et al. each teach use of dimethyl sulfoxide in minute concentrations. Without wishing to be bound to any particular theory, it is believed that the low dose DMSO recommendations are based upon the state-of-the art recognized assumed negative effects associated with toxicity of high dose DMSO on cells. We have discovered that this is an incorrect assumption. Furthermore, Dunphy and Campbell et al.'s use of an aqueous solution neutralizes the solution pH, requiring the addition of undesirable acids to obtain a threshold pH value for the tissue. In some embodiments of the present invention, high dose DMSO is novel and nonobvious substitute for water, thereby providing a non-aqueous-based solution.

In some embodiments, the present invention includes a method of obtaining and maintaining an optimal pH value for the preservation fluid, such as a pH value less than 4. In some embodiments, the optimum pH value is maintained by avoiding the use of water. The goal of maintaining an optimum pH value for the preservation fluid is to ameliorate the ability for bacteria to propagate by obtaining a threshold pH value for the tissue. All other formulations disclosed to date are based on an aqueous solution. Water-based solutions reduce the pH of the preservation fluid to neutral, which then forces prior skilled artisans to use additives to return the pH to the desired levels. The use of other additives to reduce the pH comes with changes in tissue impedance, which affects surgical instruments. Acetic acid has a pH of 2.4 intrinsically. DMSO is aprotic, therefore has minimal effect on the pH of acetic acid. By avoiding additional water, the acidic pH of the preservation fluid of the present invention is maintained in a non-aqueous environment.

In some embodiments, the present invention includes use of a preservation fluid having a high percentage of acetic acid. In some embodiments, the preservation fluid is a non-aqueous solution. In some embodiments, the method includes utilizing the preservation fluid to to promote lysis of blood clots. In some embodiments, acetic acid of the preservation fluid softens thrombin bonds and decreases thrombolysis times. At low doses (<3%) these affects are not as readily seen. To the extent that Dunphy teaches a weak acid (ethanoic acid, a.k.a. acetic acid) within an aqueous solution, Dunphy teaches no more than 3% of such acid.

In some embodiments, certain methods of the present invention include utilizing a preservation fluid of the present invention to preserve cadaveric tissue. In some embodiments, the preservation fluid is a non-aqueous solution. In some embodiments, the preservation fluid consists of high dose acetic acid, high dose DMSO, and an alcohol, such as isopropyl alcohol.

In some embodiments, methods of the present invention are similar to a pickling process, such as a pickling process for food. Generally, entire animals are not pickled because of the liquefaction that occurs under prolonged acidic environments. To maintain the crispy texture of pickled cucumbers and other vegetables, salt brine is used to desiccate and harden such vegetables. Utilizing a similar process with cadaveric tissue, however, would cause changes in electrical conductivity of the tissue. To avoid such changes, certain methods of the present invention avoid the liquefaction of pickled anatomic specimens with the use of a leathering agent, such as DMSO. In some embodiments, the method further includes the minimization of and/or the avoidance of water.

In some embodiments, electrical conduction through cadaveric tissue may be either amplified or hindered depending on the embalming technique. In some embodiments, the use of high dose DMSO and the avoidance of (or minimization of) hypertonic solutions facilitates obtaining and/or maintaining approximate tissue conduction to that of a living human. In some embodiments, the present invention facilitates tissue preservation while eliminating or otherwise reducing issues of tissue electrical impedance and flammability. In some embodiments, the methods of the present invention facilitate control of critical characteristics affecting the ability to use modern instruments/equipment and/or to practice modern surgical techniques, such as critical characteristics affecting the ability to use surgical electrocautery or radiofrequency ablation for hemostasis. In some embodiments, one or more substance of the preservation fluid of the present invention, such as DMSO, increases conductivity in cadaveric tissue, such as partially frozen tissue. In some embodiments, this increase in conductivity allows for the use of energy devices that would otherwise fail using any other embalming method.

In some embodiments, the preservation fluid is configured to at least partially dehydrate tissue and/or to function as an antibacterial solvent. In some embodiments, alcohol, such as isopropyl alcohol, is used in the preservation fluid for the two previously described properties.

Without wishing to be bound to any particular theory, it is believed that, in some embodiments of the present invention, the use of high dose acetic acid with high dose DMSO work together to simultaneously harden and soften cadaveric tissue, thereby resulting in cadaveric tissue having life-like properties. More specifically, without wishing to be bound to any particular theory, it is believed that the high-dose DMSO hardens the tissue, such as through leathering or the like, and the acetic acid softens the tissue.

In some embodiments, the present invention assists in the maintenance and/or restoration of tissue characteristics in cadaveric tissues. In some embodiments, certain methods and systems of the present invention preserve cadaveric tissue while eliminating or otherwise reducing dehydration of the tissue. In some embodiments, tissue impedance is maintained at and/or is returned to a level that is at or near impedance levels of live tissue. In some embodiments, characteristics (such as pH, osmotic concentrations, or the like) of the preservation fluid are maintained during one or more process of the present invention, such as by eliminating or otherwise reducing dilution of the preservation fluid. In some embodiments, osmotic concentrations of the preservation fluid prevents, hinders, or otherwise reduces fluid flow through cellular membranes.

It is noted that the freezing points of glacial acetic acid and DMSO are 62 degrees Fahrenheit and 66 degrees Fahrenheit, respectively. Accordingly, even if the relatively low freezing point of alcohol associated with solvents of the present invention lowers the freezing points of the glacial acetic acid and/or the DMSO, such freezing points are still substantially above the freezing point of water. Accordingly, without wishing to be bound to any particular theory, it has been hypothesized that the high freezing points of acetic acid and DMSO assists in the preservation process, such as by retarding movement and/or growth of contaminants or the like. It has been further speculated that the different characteristics (such as latent heat values and the like) of DMSO and/or glacial acetic acid provides additional benefits associated with the preservation processes of the present invention.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

DETAILED EMBODIMENTS

In one aspect, the invention provides a fluid for preserving cadaveric tissue that does not contain a non-buffering salt and does not contain an aldehyde. In one embodiment, the fluid contains an aprotic solvent, a weak acid, and a hydrocarbon with a functional group that contains an oxygen atom ("oxygenated hydrocarbon"), wherein the functional group is not an aldehyde functional group.

In one embodiment, the aprotic solvent is a polar aprotic solvent (as that term is generally known in the organic chemistry arts) such as dichloromethane (DCM), N-methylpyrrolidone, tetrahydrofuran (THF), ethyl acetate (EtOAc), acetone, dimethylformamide (DMF), acetonitrile (MeCN), dimethyl sulfoxide (DMSO), propylene carbonate (PC), and/or the like. In a preferred embodiment, the aprotic solvent is DMSO.

In one embodiment, the weak acid is an acid that does not completely dissociate there ions in water. In one embodiment, the weak acid is oxalic acid, sulfurous acid, a hydrogen sulfate ion, phosphoric acid, nitrous acid, hydrofluoric acid, methanoic acid (formic acid), benzoic acid, ethanoic acid (acetic acid), and/or the like. In one embodiment, the weak acid contains a carboxylic acid functional group and contains a total of 1, 2, 3, 4 or 5 carbons, such as e.g., methanoic acid or hydroxymethanoic acid; ethanoic acid, 2-hydroxyehtanoic acid, oxoethanoic acid, or ethanedioic acid; propanoic acid, propenoic acid, propynoic acid, 2-hydroxypropanoic acid (lactic acid), 3-hydroxypropanoic acid, 2,3-dihydroxypropanoic acid, 2-oxopropanoic acid (pyruvic acid), 3-oxopropanoic acid, 2,3-dioxopropanoic acid, propanedioic acid, 2-hydroxypropanedioic acid, 2,2-dihydroxypropanedioic acid, oxopropanedioic acid, oxirane-2-carboxylic acid; butanoic acid (butyric acid), 2-methylpropanoic acid, (E)-but-2-enoic acid, (Z)-but-2-enoic acid, 2-methylpropenoic acid, but-3-enoic acid, but-2-ynoic acid, 2-hydroxybutanoic acid, 3-hydroxybutanoic acid, 4-hydroxybutanoic acid, 2-oxobutanoic acid, 3-oxobutanoic acid, 4-oxobutanoic acid, butanedioic acid, 2-methylpropanedioic acid, (E)-butenedioic acid, (Z)-butenedioic acid, butynedioic acid, hydroxybutanedioic acid, 2,3-dihydroxybutanedioic acid (tartaric acid), oxobutanedioic acid, or dioxobutanedioic acid; pentanoic acid, 3-methylbutanoic acid, 2-methylbutanoic acid, 2,2-dimethylpropanoic acid, 3-hydroxypentanoic acid, 4-hydroxypentanoic acid, 3-hydroxy-3-methylbutanoic acid, pentanedioic acid, 2-oxopentanedioic acid, 3-oxopentanedioic acid, furan-2-carboxylic acid, or tetrahydrofuran-2-carboxylic acid, respectively. In some embodiments, the weak acid is a 6-carbon carboxylic acid such as, e.g., citric acid, isocitric acid, caproic acid, sorbic acid, adipic acid, or aconitic acid.

In a preferred embodiment, the weak acid is ethanoic acid (acetic acid).

In one embodiment, the oxygenated hydrocarbon is one or more of a 2 to 5 carbon hydrocarbon with a functional group that is one or more of an alcohol, an ether, a ketone, an ester, an amide, and/or a carboxylic acid. In one embodiment, the hydrocarbon with a functional group that contains an oxygen atom is a 1, 2, 3, 4, or 5-carbon alcohol, such as, e.g., methanol, ethanol, 1-propanol, 2-propanol (isopropyl alcohol), 1-butanol, 2-butanol, 2-methyl-1-propanol (isobutyl alcohol), 2-methyl-2-propanol (tert-butyl alcohol), 1-pentanol, 3-methyl-1-butanol, 2,2-dimethyl-1-propanol, cyclopentanol, ethylene glycol, propylene glycol, glycerol, and/or diethylene glycol.

In one embodiment, the oxygenated hydrocarbon is a 1, 2, 3, 4, or 5-carbon ketone, such as, e.g., 2-propanone (acetone), 2-butanone, 2-pentanone, and/or 3-pentanone.

In a preferred embodiment, the oxygenated hydrocarbon is acetone.

In one embodiment, the fluid for preserving cadaveric tissue, which does not contain a non-buffering salt and does not contain an aldehyde, contains DMSO, acetic acid, and acetone.

As used herein, the term "about" means the value plus or minus 15% of the value, inclusively. For example, "about 3% w/v" means 3%±0.45% w/v or all integer and non-integer values from 2.55% w/v to 3.45% w/v; and "about 100 grams" means 100 grams±15 grams or all integer and non-integer values from 85 grams to 115 grams, inclusively. Concentrations of ingredients in the fluid for preserving cadaveric tissue may be provided in percent weight of ingredient to total volume—designated as w/v (e.g., 1 gram per milliliter is 100% w/v; 1 gram per 100 milliliters is 1% w/v), volume of ingredient per total volume (by volume or v/v), or weight of ingredient per total weight (by weight or w/w)

In one embodiment, the aprotic solvent (such as any one or more of DCM, N-methylpyrrolidone, THF, EtOAc, acetone, DMF, acetonitrile, DMSO, and propylene carbonate) is present in the fluid for preserving cadaveric tissue at a concentration of >1% by volume, about 1%-2% by volume, about 10% by volume-20% by volume, about 5% by volume-15% by volume, about 15% by volume-25% by volume, about 5% by volume-29% by volume, about 10% by volume-25% by volume, about 2% by volume-30% by volume, about 3% by volume, about 4% by volume, about 5% by volume, about 6% by volume, about 7% by volume, about 8% by volume, about 9% by volume, about 10% by volume, about 11% by volume, about 12% by volume, about 13% by volume, about 14% by volume, about 15% by volume, about 16% by volume, about 17% by volume, about 18% by volume, about 19% by volume, about 20% by volume, about 21% by volume, about 22% by volume, about 23% by volume, about 24% by volume, about 25% by volume, about 26% by volume, about 27% by volume, about 28% by volume, about 29% by volume, about 30% by volume, <30% by volume, <25% by volume, or about 10% by volume-20% by volume. In a preferred embodiment, the fluid for preserving cadaveric tissue contains an aprotic solvent at a concentration of about 15% by volume (and in some embodiments by weight or w/v). In a preferred embodiment, the fluid for preserving cadaveric tissue contains about 15% DMSO by volume as the aprotic solvent.

In one embodiment, the weak acid is present in the fluid for preserving cadaveric tissue at about 20%-60% by volume, about 25%-70% by volume, about 30%-80% by volume, about 5%-30% by volume, about 5%-25% by volume, about 5%-20% by volume, about 10% by volume, about 15% by volume, about 20% by volume, about 25% by volume, about 30% by volume, about 40% by volume, about 50% by volume, about 51% by volume, about 52% by volume, about 53% by volume, about 54% by volume, about 55% by volume, about 56% by volume, about 57% by volume, about 58% by volume, about 59% by volume, about 60% by volume, about 61% by volume, about 62% by volume, about 63% by volume, about 64% by volume, about 65% by volume, about 66% by volume, about 67% by volume, about 68% by volume, about 69% by volume, about 70% by volume, about 75% by volume, or about 80% by volume. Here, the volume of weak acid is in the form of an aqueous liquid or an anhydrous liquid when stored at about 20° C. or above. Preferably, the volume of weak acid is an anhydrous liquid or saturated solution at 20° C. or above. In a preferred embodiment, the weak acid is present in the fluid for preserving cadaveric tissue at about 60% by volume.

In a preferred embodiment, the weak acid is anhydrous acetic acid, which is present in the fluid for preserving cadaveric tissue at a concentration of about 60% by volume.

In another embodiment, the weak acid is present in the fluid for preserving cadaveric tissue at a concentration of about 5 Normal-15 Normal (i.e., about 5 N-15 N), about 7 N-12 N, about 9 N-11 N, about 5 N, about 6 N, about 7 N, about 8 N, about 9 N, about 9.1 N, about 9.2 N, about 9.3 N, about 9.4 N, about 9.5 N, about 9.6 N, about 9.7 N, about 9.8 N, about 9.9 N, about 10 N, about 10.1 N, about 10.2 N, about 10.3 N, about 10.4 N, about 10.5 N, about 10.6 N, about 10.7 N, about 10.8 N, about 10.9 N, about 11 N, about 11.1 N, about 11.2 N, about 11.3 N, about 11.4 N, about 11.5 N, about 11.6 N, about 11.7 N, about 11.8 N, about 11.9 N, about 12 N, about 13 N, about 14 N, or about 15 N. In a preferred embodiment, the weak acid is present at a concentration of about 10.5 N. In a more preferred embodiment, the fluid for preserving cadaveric tissue contains about 10.5 N acetic acid.

In one embodiment, the fluid for preserving cadaveric tissue contains the oxygenated hydrocarbon at a concentration of about 1%-20% by volume, about 5%-20% by volume, about 10%-20% by volume, about 8%-12% by volume, about 7%-13% by volume, about 6%-14% by volume, about 9%-11% by volume, about 1% by volume, about 2% by volume, about 3% by volume, about 4% by volume, about 5% by volume, about 6% by volume, about 7% by volume, about 8% by volume, about 9% by volume, about 10% by volume, about 11% by volume, about 12% by volume, about 13% by volume, about 14% by volume, about 15% by volume, about 16% by volume, about 17% by volume, about 18% by volume, about 19% by volume, or about 20% by volume. In a preferred embodiment, the concentration of the hydrogenated hydrocarbon is about 7% by volume. In some preferred embodiments, the fluid for preserving cadaveric tissue contains about 7% to 10% acetone by volume. In other preferred embodiments, the fluid for preserving cadaveric tissue contains about 7% to 10% of a one- to four-carbon alcohol by volume.

In one particular embodiment, the oxygenated hydrocarbon, such as, e.g., isopropyl alcohol or acetone, is first in an aqueous diluted form, such as 70% (i.e., 140 proof for alcohols), which is then added to the fluid for preserving cadaveric tissue at a volume of 10%, which gives a final by volume concentration of about 7%.

In another embodiment, the fluid for preserving cadaveric tissue contains the oxygenated hydrocarbon at a concentration of about 500 mM-2 M, about 1 M-2 M, about 500 mM, about 600 mM, about 700 mM, about 800 mM, about 900 mM, about 1000 mM, about 1100 mM, about 1200 mM, about 1300 mM, about 1400 mM, about 1500 mM, about 1600 mM, about 1700 mM, about 1800 mM, about 1900 mM, or about 2000 mM (i.e., 2 M or 2 moles per liter. In one preferred embodiment, the fluid for preserving cadaveric tissue contains about about 0.9 M-1.5 M acetone by volume. In another preferred embodiment, the fluid for preserving cadaveric tissue contains about 0.9 M-1.5 M of a one- to four-carbon alcohol by volume.

In one embodiment, the pH of the fluid for preserving cadaveric tissue is acidic. In one embodiment, the pH of the fluid for preserving cadaveric tissue is <4, about 2-6, about 2-5, about 3-6, about 3-5, about 3.5-6, about 3.5-5, about 3, about 3.1, about 3.2, about 3.3, about 3.4, about 3.5, about 3.6, about 3.7, about 3.8, about 3.9, about 4, about 4.1, about 4.2, about 4.3, about 4.4, about 4.5, about 4.6, about 4.7, about 4.8, about 4.9, about 5, about 5.5, about 6, or about 6.5. In a preferred embodiment, the pH of the fluid for preserving cadaveric tissue is within 10% of the pKa of the weak acid. In another preferred embodiment, the pH of the fluid for preserving cadaveric tissue is 3.8-5.7 or 4.3-5.2.

In one specific embodiment, the fluid for preserving cadaveric tissue comprises about 15%-30% by volume of DMSO, 60% by volume of anhydrous acetic acid, and about 7%-10% of acetone or isopropyl alcohol.

In another specific embodiment, the fluid for preserving cadaveric tissue comprises about 2-4.5 M DMSO, about 9-12 N acetic acid, and about 850 mM-1.5 M acetone or isopropyl alcohol, more preferably acetone. In yet another specific embodiment, the fluid for preserving cadaveric tissue comprises about 2.11 M DMSO, about 10.5 N acetic acid, and about 920 mM, about 940 mM, about 1.31 M, or about 1.35 M acetone or isopropyl alcohol, more preferably acetone.

In a second aspect, the invention provides a method of preserving cadaveric tissue by injecting into the cadaveric tissue any one or more embodiments of the fluid for preserving cadaveric tissue described herein above and of the first aspect. In one embodiment, the cadaveric tissue is part of a cadaver separated from a whole cadaver. In another embodiment, the cadaveric tissue is the whole cadaver. In yet another embodiment, the cadaveric tissue is part of a cadaver not separated from a whole cadaver.

In a preferred embodiment, the fluid for preserving cadaveric tissue has a pH of 3.8-5.7 or 4.3-5.2 and contains about 2-4.5 M DMSO, about 9-12 N acetic acid, and about 850 mM-1.5 M acetone or isopropyl alcohol, more preferably acetone. In another preferred embodiment, the fluid for preserving cadaveric tissue has a pH of 3.8-5.7 or 4.3-5.2 and contains about 2.11 M DMSO, about 10.5 N acetic acid, and about 920 mM, about 940 mM, about 1.31 M, or about 1.35 M acetone or isopropyl alcohol, more preferably acetone.

In one embodiment, the fluid for preserving cadaveric tissue-treated cadaver or cadaveric tissue is preserved without the need for refrigeration for at least 2 weeks, at least 3 weeks, at least 4 weeks, at least 5 weeks, at least 6 weeks, at least 7 weeks, at least 8 weeks, at least 9 weeks, at least 10 weeks, at least 11 weeks, at least 12 weeks, at least 13 weeks, at least 14 weeks, or at least 15 weeks. In a preferred embodiment, the fluid for preserving cadaveric tissue-treated cadaver or cadaveric tissue is preserved without the need for refrigeration for at least 3 months.

The foregoing and other objects are intended to be illustrative of the invention and are not meant in a limiting sense. Many possible embodiments of the invention may be made and will be readily evident upon a study of the following specification and accompanying. drawings comprising a part thereof. Various features and subcombinations of the invention may be employed without reference to other features and subcombinations. Other objects and. advantages of this invention will become apparent from the following description. taken in connection with the accompanying drawings, wherein is set forth by way of illustration and example, an embodiment of this invention and various features thereof.

What is claimed is:

1. A fluid for preserving cadaveric tissue, the fluid comprising:
   an aprotic solvent in a first amount;
   a weak acid in a second amount; and
   a non-aldehyde oxygen-containing hydrocarbon in a third amount,
   wherein the first amount is about 30% by volume of the fluid, wherein the second amount is about 60% by volume of the fluid, and wherein the third amount is about 10% by volume of the fluid.

2. The fluid of claim 1, wherein the aprotic solvent is Dimethyl Sulfoxide (DMSO), wherein the weak acid is acetic acid, and wherein the non-aldehyde oxygen-containing hydrocarbon is isopropyl alcohol.

3. The fluid of claim 1, wherein the aprotic solvent is Dimethyl Sulfoxide (DMSO).

4. The fluid of claim 1, wherein, excluding any water associated with the weak acid, the fluid is an anhydrous solution.

5. The fluid of claim 4, wherein the fluid is free of aldehyde.

6. The fluid of claim 1, wherein the fluid consists of the aprotic solvent, the weak acid, and the non-aldehyde oxygen-containing hydrocarbon.

7. The fluid of claim 6, wherein the pH of the weak acid is below 4.

8. The fluid of claim 7, wherein the weak acid is glacial acetic acid.

9. A fluid for preserving cadaveric tissue, the fluid comprising:
   an aprotic solvent in a first amount;
   a weak acid in a second amount; and
   a 140 proof alcohol in a third amount,
   wherein the first amount is between about 15% and about 30% by volume of the fluid.

10. The fluid of claim 9, wherein the aprotic solvent is Dimethyl Sulfoxide (DMSO), wherein the weak acid is acetic acid, and wherein the alcohol is isopropyl alcohol.

11. The fluid of claim 9, wherein the aprotic solvent is Dimethyl Sulfoxide (DMSO).

12. The fluid of claim 9, wherein the fluid is free of aldehyde.

13. The fluid of claim 12, wherein the pH of the weak acid is below 4.

14. The fluid of claim 13, wherein the weak acid is glacial acetic acid.

15. A method of preserving cadaveric tissue, the method comprising injecting into the cadaveric tissue the fluid according to claim 1 or 9.

* * * * *

UNITED STATES PATENT AND TRADEMARK OFFICE
CERTIFICATE OF CORRECTION

PATENT NO. : 11,716,989 B2
APPLICATION NO. : 16/945279
DATED : August 8, 2023
INVENTOR(S) : Fernandez It is certified that error appears in the above-identified patent and that said Letters Patent is hereby corrected as shown below:

On the Title Page

On Page 2, Column 1, Item (56), under "OTHER PUBLICATIONS", Line 12, delete "Anals" and insert -- Annals --, therefor.

In the Specification

In Column 5, Line 10, delete "to to" and insert -- to --, therefor.

In Column 9, Line 42, delete "about about" and insert -- about --, therefor.

In Column 10, Line 37, delete "accompanying." and insert -- accompanying --, therefor.

In Column 10, Line 40, delete "and." and insert -- and --, therefor.

In Column 10, Lines 41-42, delete "description." and insert -- description --, therefor.

Signed and Sealed this
Fifth Day of December, 2023

Katherine Kelly Vidal
*Director of the United States Patent and Trademark Office*